(12) United States Patent
Han et al.

(10) Patent No.: US 9,772,717 B2
(45) Date of Patent: Sep. 26, 2017

(54) INPUT SENSOR FOR AN ELECTRONIC DEVICE

(71) Applicant: Samsung Electronics Co., Ltd., Gyeonggi-do (KR)

(72) Inventors: Jae-Ryong Han, Gyeonggi-do (KR); Jeong-Seok Park, Gyeonggi-do (KR); Young-Bae Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 222 days.

(21) Appl. No.: 14/305,507

(22) Filed: Jun. 16, 2014

(65) Prior Publication Data
US 2015/0070324 A1    Mar. 12, 2015

(30) Foreign Application Priority Data
Sep. 9, 2013  (KR) .......................... 10-2013-0108169

(51) Int. Cl.
*G06F 3/042* (2006.01)
*G06K 9/00* (2006.01)
*G06F 1/16* (2006.01)

(52) U.S. Cl.
CPC ............ *G06F 3/042* (2013.01); *G06F 1/1626* (2013.01); *G06F 1/1684* (2013.01); *G06K 9/00013* (2013.01); *G06K 9/00067* (2013.01)

(58) Field of Classification Search
CPC ...... G06F 3/042; G06F 1/1684; G06F 1/1626; G06K 9/00013; G06K 9/00067
See application file for complete search history.

(56) References Cited

U.S. PATENT DOCUMENTS

| | | | | |
|---|---|---|---|---|
| 2011/0032077 A1* | 2/2011 | Setlak | ................. | G06K 9/0002 340/5.83 |
| 2012/0112764 A1* | 5/2012 | Goldenberg | ............ | H01L 21/56 324/629 |
| 2013/0259329 A1* | 10/2013 | Wickboldt | ............. | H05K 1/189 382/124 |
| 2015/0000837 A1* | 1/2015 | Kim | ..................... | A61B 5/1172 156/275.5 |
| 2015/0294135 A1* | 10/2015 | Kim | ....................... | H01L 23/04 382/124 |

FOREIGN PATENT DOCUMENTS

KR    1020100083053    7/2010

* cited by examiner

*Primary Examiner* — Patrick Edouard
*Assistant Examiner* — Joseph Fox
(74) *Attorney, Agent, or Firm* — The Farrell Law Firm, P.C.

(57) ABSTRACT

An input sensor, an electronic device comprising such, and a method of manufacturing the same are described. The input sensor may be implemented as part of a mechanical key input. The input sensor includes a substrate having a first substrate portion with a signal pattern unit patterned therein, the signal pattern unit configured to generate a signal according to a touch or proximity of an object, and a second substrate portion having an integrated circuit united disposed thereon, the integrated circuit being electrically connected to the surface pattern unit, and a key support having a seating portion configured to support the substrate. The input sensor, electronic device, and the manufacturing method can be modified without limit.

25 Claims, 13 Drawing Sheets

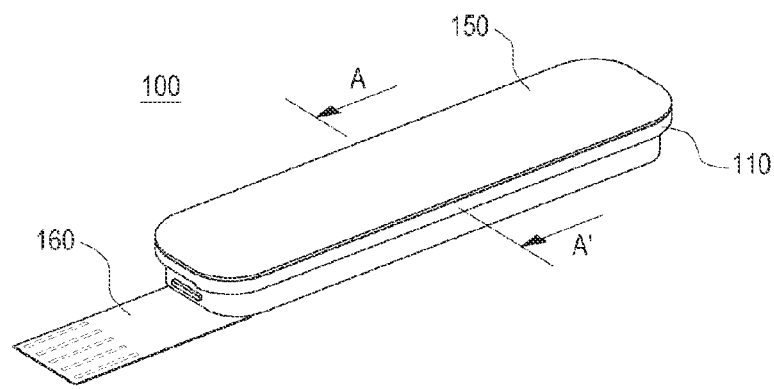
FIG.2
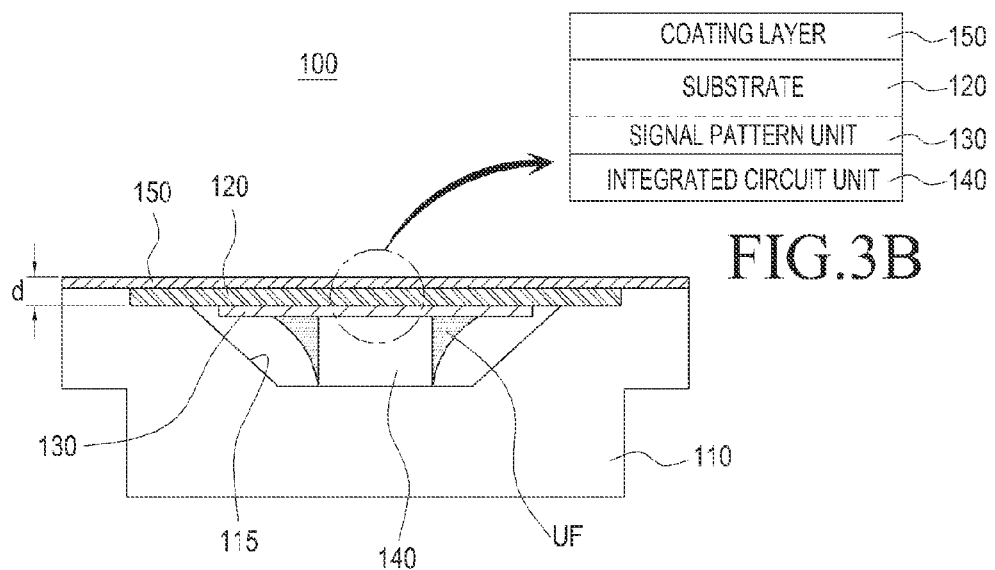
FIG.3B
FIG.3A

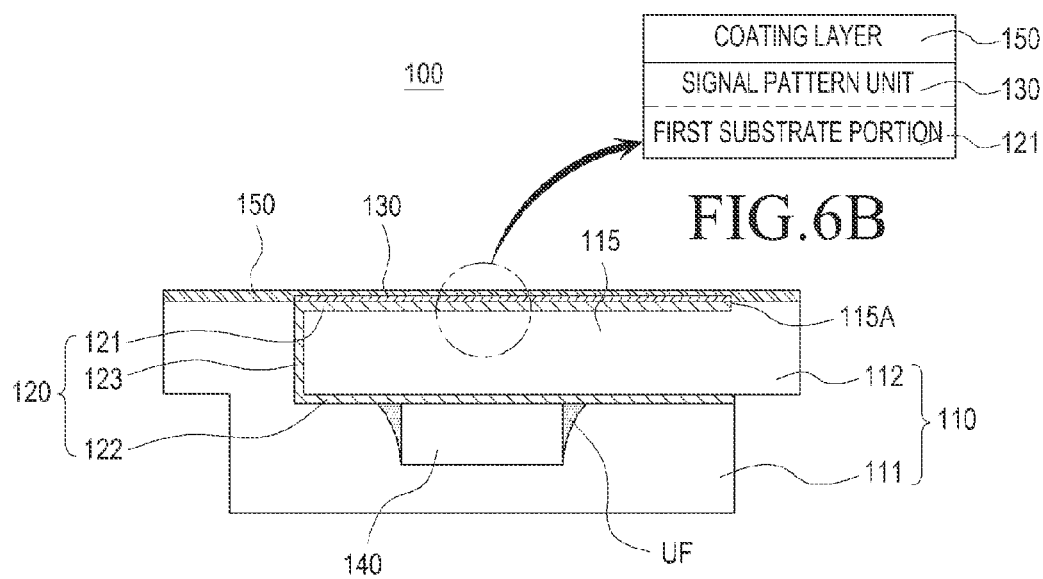
FIG.6A
FIG.6B
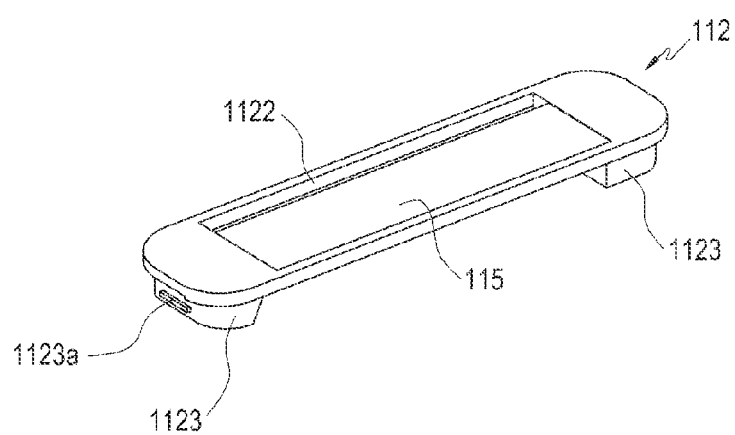
FIG.7 under 35 U.S.C. §119(a)# INPUT SENSOR FOR AN ELECTRONIC DEVICE

PRIORITY

This application claims priority under 35 U.S.C. §119(a) to Korean Application Serial No. 10-2013-0108169, which was filed in the Korean Intellectual Property Office on Sep. 9, 2013, the entire content of which is incorporated herein by reference.

BACKGROUND OF THE INVENTION

1. Field of the Invention

The present invention relates to an electronic device, and more particularly to an input/sensor for a portable electronic device.

2. Description of the Related Art

Generally, the term "electronic device" refers to devices which a user carries to use various contents, for example, a portable terminal, a Personal Media Player (PMP), or an MP3 player. Portable electronic devices have been mainly designed considering the movement of a user in order that they have easy portability and various functions thereof. Such portable electronic devices have various form factors according to their intended use, the trends of the time, and consumers' requirements. Recently, the use of bar-type electronic devices which have various functions, such as smart phones, tablet PCs, and the like, has increased.

In the case of recent bar-type electronic devices, as diary or multimedia functions have been installed, only the portable electronic device may be used to utilize various contents including voice communication, financial services, game/multimedia services, wireless Internet services, and the like. In bar-type electronic devices, often one large display panel on a whole surface of the electronic device is the main input and output for the electronic device.

At least one or more devices are provided to the bar-type electronic device in order to implement an input. For example, in the case of bar-type electronic devices such as recent smart phones, a large-scale touch panel is provided to a whole surface of the electronic device. In the electronic device, an input can be carried out through the large-scale touch panel display unit on the whole surface thereof. Also, button keys such as a side key, a central on/off key, and the like are separately mounted on a side surface or a periphery of the electronic device, so as to turn on/off an electric power supply unit, to execute an input and a deletion/cancelling, to execute a camera, to control a volume, to lock/unlock a display unit and the like.

The input to the display unit described above is implemented tactilely by recognizing a contact to or proximity to the display unit and/or mechanically by using button keys.

The button keys of the electronic device are arranged on a periphery of the display unit, for example, in a vessel region (a peripheral region of the display unit in a whole surface of the electronic device) or a side surface of the electronic device. Since the mechanical-type button keys need a large number of components and a wide mounting space, the number of button keys affects the slimness of the electronic device.

Recent and widely used electronic devices such as smart phones have various functions and many pieces of personal information, such as simple personal information (e.g., address), personal financial information, payment means relating information, and the like. Accordingly, if the electronic device is lost, the personal information may be exposed or there may be other types of security problems. In order to solve the security problems, various methods for locking the electronic device have been proposed. For example, a locking on/off of the electronic device may be implemented by the user inputting a pattern through the touch panel, or a combination of numerals.

Further, a small number of security solutions using a fingerprint have been provided. However, these fingerprint solutions have the difficulty of securing a separate mounting space for the fingerprint sensor, and have the problem of not providing both security and convenience.

SUMMARY OF THE INVENTION

The present invention is made to solve the above mentioned problems and to provide the advantages discussed below. One aspect of the present invention is to provide an input/sensor for enhancing the security of an electronic device, while requiring a minimum mounting space.

Another aspect of the present invention is to provide an input/sensor for detecting a contact or proximity of an object, particularly a finger print.

Still another aspect of the present invention is to provide an electronic device which is equipped with an input/sensor implemented in a key input, such as a home button, for detecting a contact or proximity of an object.

In accordance with an aspect of the present invention, an input sensor for an electronic device includes a key support having a seating portion configured to support a substrate, the substrate having a signal pattern unit patterned on a first surface, the signal pattern unit configured to generate a transmission signal or a reception signal according to a touch or proximity of an object, and an integrated circuit unit disposed on a second surface and electrically connected to the signal pattern unit; and a controller configured to process a signal received from the signal pattern unit or the integrated circuit unit.

In accordance with another aspect of the present invention, an electronic device includes a mechanical key input having a sensor input, the sensor input having a substrate comprising a first surface patterned with a signal pattern unit, the signal pattern unit configured to generate a signal according to a touch or proximity of an object, and a second surface having an integrated circuit unit disposed thereon, the integrated circuit unit being electrically connected to the signal pattern unit; and a key support comprising a seating portion configured to support the substrate.

In accordance with still another aspect of the present invention, a method of manufacturing an input sensor includes providing a key support having a seating portion, the seating portion comprising a top surface and a bottom surface; providing a substrate configured to mount the seating portion of the key support, the substrate comprising a first substrate portion and a second substrate portion; and mounting the substrate on the seating portion of the key support such that the first substrate portion is disposed on the top surface and the second substrate portion is disposed on the bottom surface.

BRIEF DESCRIPTION OF THE DRAWINGS

The above and other aspects, features, and advantages of the present invention will be more apparent from the following detailed description taken in conjunction with the accompanying drawings, in which:

FIG. 2 is a view illustrating an input/sensor according to a first embodiment of the present invention (the "trench" embodiment);

FIG. 3A is a cross-sectional view of the input/sensor, taken along the line A-A' in FIG. 2, while FIG. 3B illustrates the layers forming the surface of the input/sensor in FIG. 3A, according to the first embodiment of the present invention;

FIG. 6A is a cross-sectional view of the input/sensor, taken along a line B-B' in FIG. 5, while FIG. 6B illustrates the layers forming the surface of the input/sensor in FIG. 6A, according to the second and third embodiments of the present invention;

FIG. 7 is a view of a second key support member of an input/sensor according to the second "through-hole" embodiment of the present invention;

FIG. 8A is a view of an input/sensor according to the second "through-hole" embodiment of the present invention, in which a first key support member is provided to the second key support member equipped with the substrate, while

DETAILED DESCRIPTION OF EMBODIMENTS OF THE PRESENT INVENTION

Figure 1A:
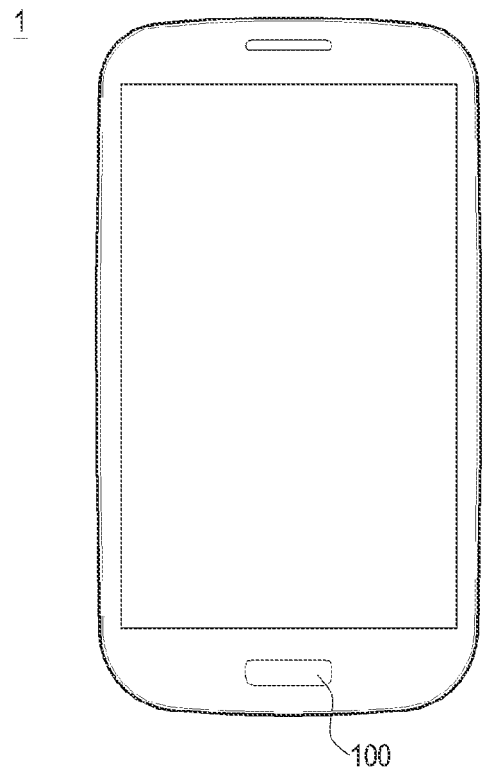
FIG. 1A is a view of an electronic device in which the home key has been implemented with a fingerprint sensor according to one of various embodiments of the present invention.

Hereinafter, an input/sensor of an electronic device according to the embodiments of the present invention will be described with reference to the accompanying drawings. In the description, the thickness of lines and sizes of structural elements in the drawings may be out of proportion for convenience and definition of the description. Further, components to be described later are defined only by considerations of their functions in the present invention, and may be changed according to the needs of the user, the intentions of the manufacturer, applicable standards or conventions, etc. Therefore, the definitions of terms should be understood, but not limited, based on contents throughout the specification.

Furthermore, in the description of the embodiments of the present invention, ordinal numbers such as first and second are used, but are to merely distinguish objects having the same name from one another. Orders thereof may be arbitrarily determined and the description of a preceding object can be applied to a following object.

In the following description, an input/sensor according to various embodiments of the present invention is implemented as a home button on the periphery of a large-scale touch panel on the front surface of a bar-type electronic device. This is only an example of an input/sensor implemented in an electronic device according to embodiments of the present invention. For example, the input/sensor according to the embodiments of the present invention is not limited to the home button. As another example, the input/sensor according to embodiments of the present invention may be separately provided on a rear surface or a side surface of the electronic device, or may be implemented as an electric power supply key, a volume control key, and the like which are arranged on a side surface of the electronic device. The input/sensor described herein may be changed or modified.

Further, examples of an electronic device according to embodiments of the present invention include all information and communication devices, multimedia devices and application devices thereof, and all kinds of mobile communication terminals and portable communication devices which operate depending on communication protocols corresponding to various communication systems, including, but not limited to, a Portable Multimedia Player (PMP), an MP3 player, a navigation unit, a game player, a lap-top computer, a netbook, a billboard, a TV, a digital broadcasting player, a Personal Digital Assistant (PDA), a smart phone and the like.

FIG. 1A is a view of an electronic device equipped with an input/sensor according to a first embodiment of the present invention. The input/sensor 100 is partially exposed on the electronic device 1 and is configured to receive an input of a user. Further, the input/sensor 100 is configured to perform a click operation like a mechanical button key, and may include an additional sensor unit (not shown), i.e. a grip sensor, a proximity sensor, a gesture sensor and the like, therein.

Figure 1B:
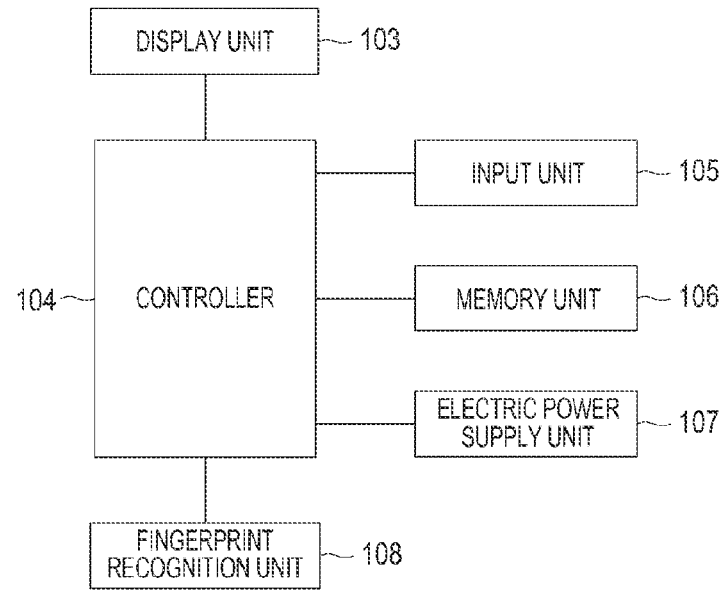
FIG. 1B is a block diagram of some of the pertinent components of the electronic device equipped with the fingerprint sensor according to one of the embodiments of the present invention.

FIG. 1B is a block diagram illustrating components of an electronic device according to one of the embodiments of the present invention. The electronic device 1 includes a controller 104, a display unit 103, an input unit 105, a memory unit 106, an electric power supply unit 107 and a fingerprint recognition unit 108. With respect to each structural element, the input unit 105 is provided with input keys for inputting numeral and character information and functional keys for setting various functions, and the display unit 103 displays an image signal on a screen and also displays data requested by the controller 104 to be output. If the display unit 103 is implemented in an electrostatic capacitive type or a resistive type touch screen, the input unit 105 may include predetermined minimal keys, and the display unit 103 may be substituted for the key input function of the input unit 105.

The controller 104 receives signals from the fingerprint recognition unit 108 and processes the signals to perform a predetermined operation. Specifically, for example in the embodiments discussed further below, the signal is generated by signal pattern unit 130 and applied to integrated circuit unit 140 which sends the signals to controller 104. However, in other embodiments, the controller 104 may receive the signal directly from the signal pattern unit and.

The memory unit 106 includes a program memory and a data memory. Here, the program memory stores a booting and Operating System (hereinafter, referred to as "OS") for controlling general operations of the electronic device 1, and the data memory stores various data created during the operation of the electronic device.

The electric power supply unit 107 supplies electric power from a battery to various parts of the electronic device 1 under a control of the controller 104.

The fingerprint recognition unit 108 includes a sensor, such as input/sensor 100, as to detect a touch or proximity of an object. Fingerprint recognition unit 108 is capable of performing a function of recognizing a fingerprint input by a user. In embodiments of the present invention discussed herein, input/sensor 100 comprises fingerprint recognition unit 108, and is electrically connected to the controller 104 and performs communication with the controller 104 under a desirable provision. Further, the fingerprint recognition unit 108 is supplied with electricity from electric power supply unit 107 in the electronic device 1, and a communication provision between the fingerprint recognition unit 108 and the controller 104 may be one of I2C or SPI which may also be applicable to sensors provided in the electronic device 1.

Figure 4:
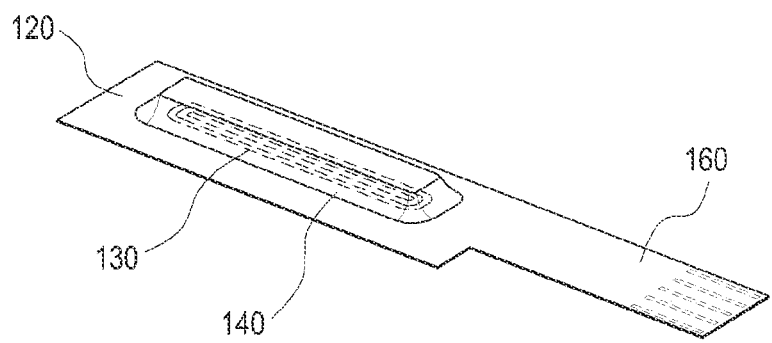
FIG. 4 is a view of the substrate of the input/sensor according to the first embodiment of the present invention.

FIG. 2 is a view illustrating an input/sensor according to a first embodiment of the present invention. FIG. 3A is a cross-sectional view, taken along the line A-A' in FIG. 2, of the input/sensor, while FIG. 3B shows the surface layers of the cross-section in FIG. 3A. FIG. 4 is a view illustrating a substrate of an input/sensor according to the first embodiment of the present invention.

Referring to FIGS. 2 to 4, the input/sensor 100 according to the first embodiment of the present invention includes a key support 110, a substrate 120, a signal pattern unit 130 and an integrated circuit unit 140. The key support 110 will be disposed in a surface of electronic device 1. Particularly, the key support 110 will be placed at the periphery of the display unit provided in the electronic device 1. If the input/sensor 100 is a 'home button' in the embodiment of the present invention, it may be disposed at a center portion on a lower portion of the front surface of the electronic device 1, such as shown in FIG. 1. The key support 110 of the present invention may be made from thermoplastic resin such as polycarbonate (PC).

The substrate 120 is manufactured such that the signal pattern unit 130 and the integrated circuit unit 140 are disposed thereon, while key support 110 is made through the injection molding, and the two are then assembled together. However, the key support 110 according to some embodiments of the present invention is not manufactured through injection molding alone, and the assembling of the key support 110 with the substrate 120 is not achieved through injection molding. For example, the key support 110 and the substrate 120 may be assembled by using a coupling means such as a double sided adhesive tape or by a pressing or a die press. The key support 110 may also be manufactured using a pressing or a die press. The process of manufacturing the key support or the configuration of the key support may be changed or modified without limit.

The key support 110 has a seat portion 115 on which the substrate 120, with the signal pattern unit 130 and the integrated circuit unit 140 disposed thereon, is arranged. The substrate 120 is a flexible film member which is disposed in such a manner that one surface thereof is exposed to the outside while the other surface thereof is opposite to the seat portion 115. In the first embodiment, the signal pattern unit 130 and the integrated circuit unit 140 are provided on the lower surface of the substrate 120. The substrate 120 according to the first embodiment of the present invention forms a flat surface with the periphery of the upper portion of the key support 110. To do this, the key support 110 has a step formed at the periphery of the upper portion of seat portion 115 in which the substrate 120 is seated. The peripheral edge of the substrate 120 is engaged with the inner surface of the step in the upper portion of seat 115. Accordingly, when a coating layer 150 is coated on the substrate 120 and the key support 110, the coating layer 150 may have a predetermined thickness and it is possible to prevent an irregular surface generated due to a coupling line.

The coating layer 150 is coated on the upper surface of the key support 110 to cover the surface of substrate 120 exposed to the outside. When the coating layer 150 is coated, a coupling line between the substrate 120 and the key support 110, or an under-fill mark generated by the integrated circuit unit 140 mounted on the substrate 120, can be covered. The coating layer 150 according to embodiments of the present invention has one or more layers coated by a desired thickness in order to isolate the input/sensor 100 or to increase an aesthetic appeal of the input/sensor 100. The coating layer 150 is coated with a thick enough coat that it covers the front surface of the substrate 120 and the coupling line and a thin enough coat that the signal pattern unit 130 attached to a rear surface of the substrate 120 can detect a contact of an object on a front surface of the substrate 120. The thickness of the coating layer 150 may be changed or modified depending on the thickness of the substrate 120 and a signal detecting distance of the signal pattern unit 130 in order that the signal pattern unit 130 can detect a contact on the front surface of the substrate 120.

In the first embodiment, the signal pattern unit 130 including Rx (reception) and Tx (transmission) patterns are on the rear surface of the substrate 120. In the embodiments of the present invention, the signal pattern unit 130 will be described formed on one or another surface of the substrate 120 with a desired thickness, but this is to illustrate possible positions and configurations of the signal pattern unit 130. The signal pattern unit is not limited to the description. For example, the signal pattern unit 130 may be provided on a lower surface of the substrate 120 to have a desired thickness, may be printed on the lower surface of a thin flexible substrate 120, or may be formed on the lower surface of the substrate 120 by an etching. The configuration, shape, and form of the signal pattern unit 130 may be changed or modified without limit.

The signal pattern unit 130 is made of a conductive material such as copper, and has a transmission side signal pattern and a reception side signal pattern. The signal pattern unit 130 is electrically connected to the integrated circuit unit 140 provided on a surface of the substrate 120. As described above, the integrated circuit unit 140 is attached to the lower surface of the substrate 120, and is electrically connected to the signal pattern unit 130.

The substrate 120 is provided at one end thereof with a connecting substrate portion 160 extending in a longitudinal direction, which also extends out of the key support 110 when assembled, and is electrically connected to a circuit board disposed in the electronic device 1. The signal pattern unit 130 according to one of the embodiments of the present invention comprises a portion of a fingerprint recognition unit, such as a fingerprint sensor which recognizes a fingerprint of a user in order to maintain security of the electronic device 1.

As described above in relation to FIG. 1B, the fingerprint recognition unit includes a fingerprint recognition sensor which may be any one of a swipe-type fingerprint recognition sensor or an area-type fingerprint recognition sensor. Of course, the fingerprint recognition sensor may include another type of fingerprint recognition sensor which recognizes a fingerprint of a user, as well as the swipe-type and area-type fingerprint recognition sensors.

The swipe-type fingerprint recognition sensor recognizes a user's fingerprint when the user slides his/her finger on the sensor, while the area-type fingerprint recognition sensor recognizes a user's fingerprint when the user puts his/her finger motionless on the sensor. In one of the embodiments of the present invention, the input/sensor 100 is implemented in the home key thereby adding a fingerprint recognition function to the home key and increasing the security of the electronic device 1. When the input/sensor 100 according to an embodiment of the present invention is implemented in a key on a side of the electronic device, the fingerprint recognition function is added to the side key (such as, e.g., a key capable of controlling the volume or turning on/off the electronic device), thereby increasing the security of the electronic device.

In the input/sensor 100 described above, the substrate 120 is disposed in the seat portion 115 provided on an upper surface of the key support 110. The coating layer 150 is coated on the surface comprised of the exposed portions of key support 110 and substrate 120. Further, the signal pattern unit 130 and the integrated circuit unit 140 are disposed under the substrate 120. Accordingly, the longest distance at which the signal pattern unit 130 is capable of detecting a signal corresponds to a thickness d from the exposed surface of the coating layer 150 to the bottom surface of the substrate 120. The coating layer 150 prevents the upper surface of substrate 120, the remaining exposed upper portions of key support 110, the connecting line between the substrate 120 and the key support 110, and the mark caused by the under-fill (UF) around the integrated circuit unit 140 attached to the bottom surface of the substrate 120, from being exposed. The coating layer 150 may have plural layers, and may include a primer, a color layer, a coating layer, and the like if necessary. Further, the coating layer 150 may be formed on the surface of the key support 110 as a painting, an in-mold, a printing, a coating and the like.

Figure 11:
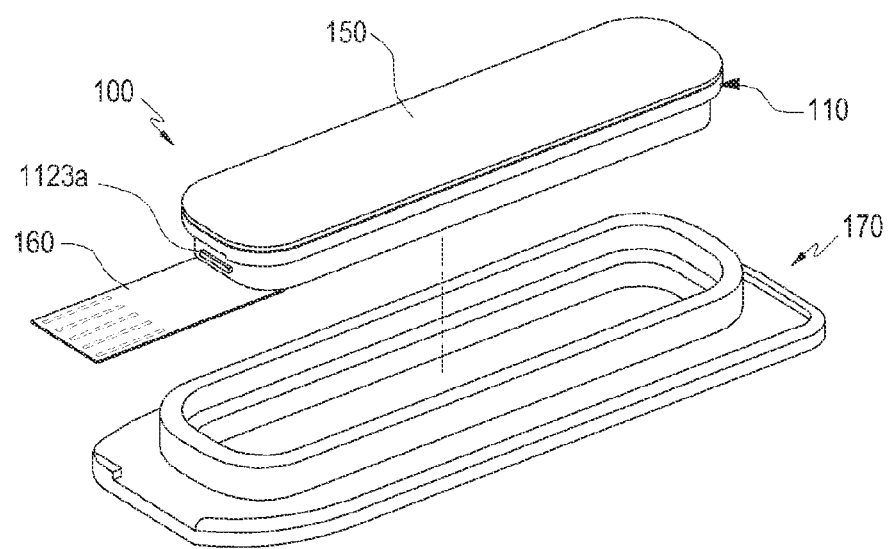
FIG. 11 is a view illustrating how a decoration unit is assembled with a complete key support member according to embodiments of the present invention.

As shown in FIG. 11 discussed further below, key support 110 may also be assembled with a decoration unit 170 before being mounted to the electronic device 1. The decoration unit 170 enhances the aesthetic appeal when it is mounted on the electronic device 1, and increases the rigidity of the key support 110. The decoration unit 170 has a slot into which the key support 110 according to an embodiment of the present invention is seated. In embodiments in which, like FIG. 11, a protrusion 1123a having a hook shape is formed on the outside surface of key support 110, a corresponding latch is formed on the inner surface of the decoration unit 170 to be engaged with the protrusion 1123a. The present invention is not limited to such a protrusion and latch coupling mechanism. For example, in other embodiments of the present invention, the coupling mechanism may be changed or modified, for example, it may include a bonding material such as a double sided tape interposed between the key support 110 and the decoration unit 170.

Hereinafter, the input/sensor 100 according to other embodiments of the present invention will be described with reference to FIGS. 5 to 14. The input/sensor 100 implemented in the home button like in the first embodiment of the present invention will continue to be used as an example. However, an input/sensor 100 according to the present invention is not limited to implementation as the home button.

Figure 5:
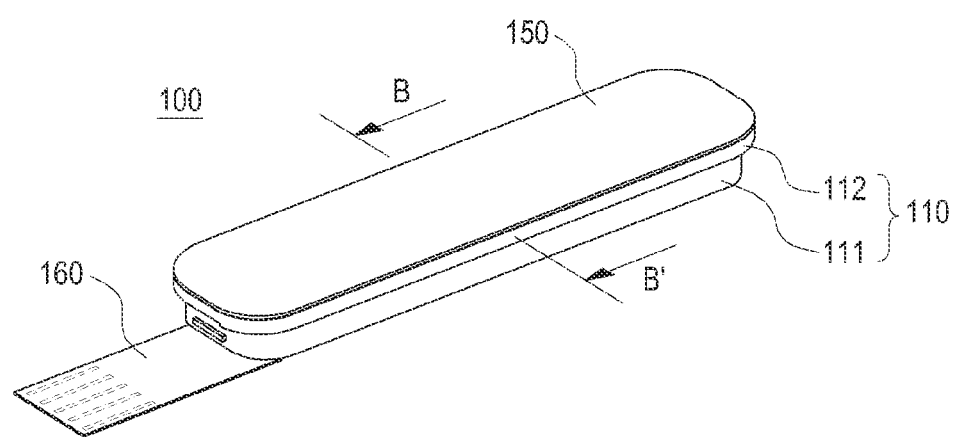
FIG. 5 is a view illustrating an input/sensor according to a second embodiment (the "through-hole" embodiment) and a third embodiment (the "cutaway" embodiment) of the present invention.

FIG. 5 is a view illustrating an input/sensor according to a second and third embodiment of the present invention, FIG. 6A is a cross-sectional view, taken along a line B-B' in FIG. 5, of the input/sensor, and FIG. 6B illustrates the layers forming the surface of the input/sensor in FIGS. 5 and 6A.

Referring to FIGS. 5 through 6B, the input/sensor 100 of the second and third embodiments has a different form and shape from the first embodiment. Specifically, although the input/sensor 100 includes a key support 110, a substrate 120, a signal pattern unit 130, and an integrated circuit unit 140 like the input/sensor of the first embodiment, the key support 110 and the substrate 120 have a different shape/form than that of the first embodiment. The mounting position/arrangement of the signal pattern unit 130 is also changed from the first embodiment. Further, the input/sensor 100 has a difference in that the substrate 120 includes an extension extending in a direction therefrom (in one embodiment of the present invention, it is referred to as the first and second substrate).

Moreover, the key support 110 according to the second and third embodiments of the present invention includes a first key support member 111 and a second key support member 112, either of which may be generated by injection molding. In the second and third embodiments, the substrate 120 including the signal pattern unit 130 and the integrated circuit unit 140 thereon is placed on a portion of the second key support member 112, and then the first key support member 111 is formed by injection molding on the second key support member 112.

Figure 8A:
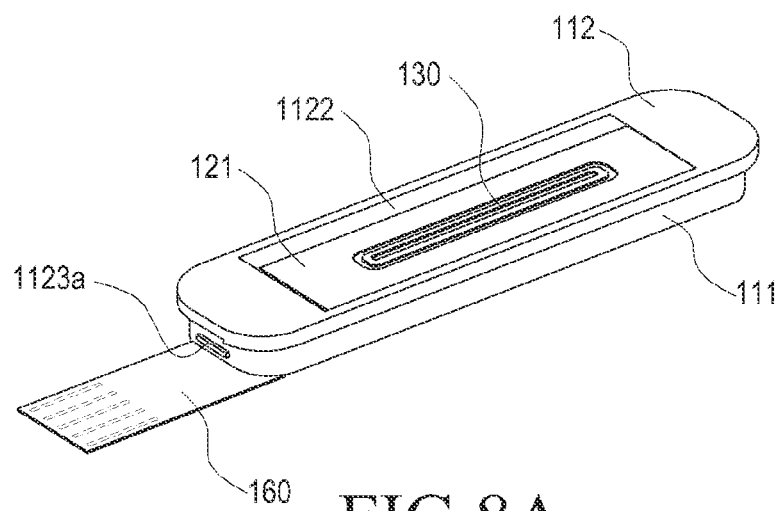
Figure 8B:
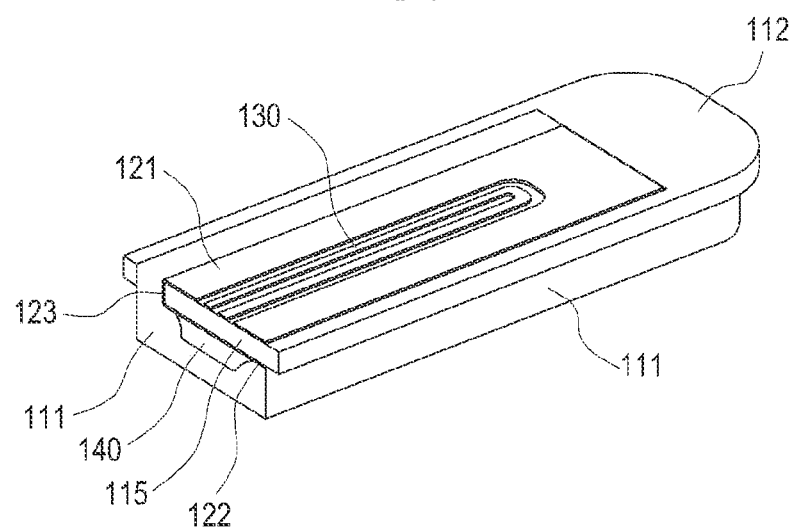
FIG. 8B is a cross-sectional view of the input/sensor in FIG. 8A.

FIG. 7 is a view illustrating a second key support member 112 of an input/sensor according to the second embodiment of the present invention (sometimes referred to herein as the "through-hole" embodiment), FIG. 8A is a view illustrating the assembly of the first key support member 111 with the second key support member 112 on which substrate 120 has already been provided, and FIG. 8B is a cross-sectional view of the assembly in FIG. 8C according to the second ("through-hole") embodiment of the present invention.

Referring to FIGS. 7 through 8B, seat 115 is formed as a protrusion from the inner surface of the second key support member 112. As will be described later, substrate 120 is seated around the seat 115. The protrusion of seat 115 forms a step 115A from the inner surface portion of second key member 112 in a depth identical to the thickness of the portion of substrate 120 disposed on top of seat 115. Specifically, a first substrate portion 121 of substrate 120 is seated on top of seat 115, and the top surfaces of first substrate portion 121 and second key support member 112 are located in the same plane. Then, a coating layer 150 described later is coated on the key support 110 so that an irregular surface or other surface defect is prevented from being generated.

A pair of supporting portions 1123 extends from the ends of the bottom of the second key support member 112. Seat 115 around which substrate 120 is bent is located between the supporting portions 1123, and the first key support member 111 is injection molded in the empty space between the supporting portions 1123. As discussed above in reference to FIG. 11, coupling member 1123a may be provided on the outer surface of one or both supporting portions 1123, and is coupled to a decoration unit 170. The coupling member in these embodiments includes a hook shaped protrusion 1123a extending outwardly from at least one supporting portion 1123, and is latched by a latch formed in the inner surface of the decoration unit 170.

In the second embodiment as shown in FIG. 7, a through hole 1122 is formed between an inner side of key support member 112 and the side of the seat 115. When disposing substrate 120 on seat 115, substrate 120 is inserted in the through hole 1122 and then wrapped around seat 115 formed in the second key support member 112. Specifically, substrate 120 bends around seat 115, thereby forming first substrate portion 121 on top of seat 115, second substrate portion 122 on the bottom of seat 115, and third or "bent" substrate portion 123 on the open side of seat 115. The through hole 1122 is closed when the first key support member 111 is injection molded onto second key support member 112, as shown in FIG. 8B.

In embodiments where substrate 120 is bent around seat 115 formed as a protrusion within the second key support member 112, the substrate 120 is manufactured so that signal pattern unit 130 is disposed on a surface of first substrate portion 121 and the integrated circuit unit 140 is disposed on a surface of second substrate portion 122.

In these embodiments of the present invention, the first key support member 111 is formed on the second key support member 112 by injection molding. However, this is merely an example to facilitate understanding the process of manufacture and the function of the shape of key support 110. Therefore, the shape and configuration of key support 110 and how substrate 120 is disposed thereon may be changed and modified according to other embodiments of the present invention.

Figure 12A:
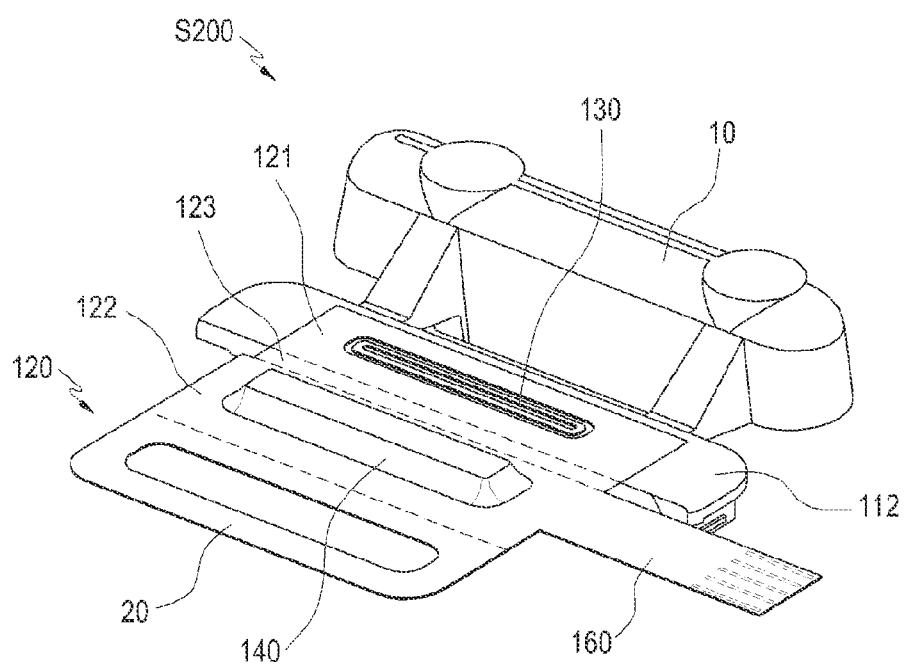
FIGS. 12A to 12F are views sequentially illustrating a process of manufacturing an input/sensor according to the third "cutaway" embodiment of the present invention.
Figure 12B:
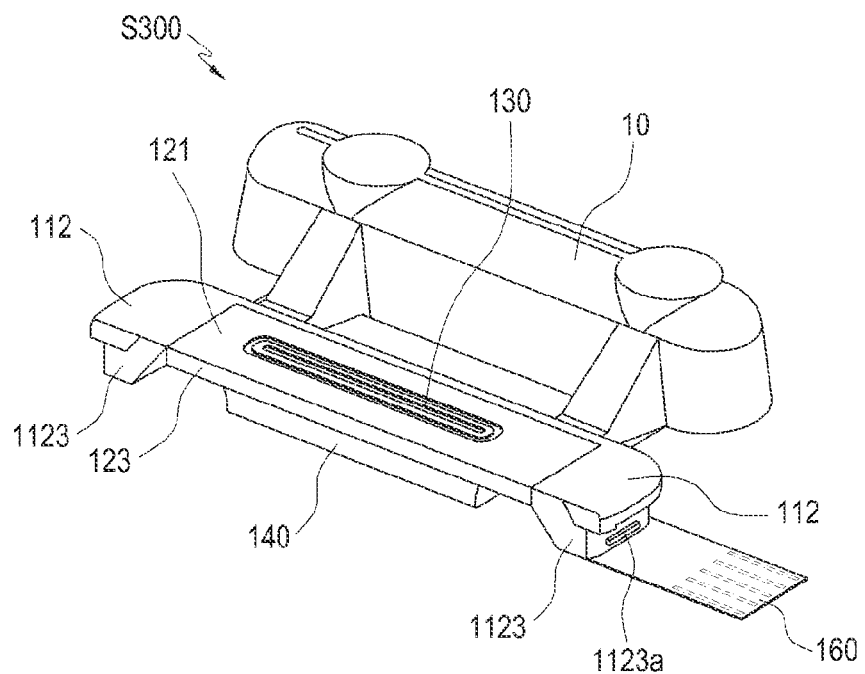
Figure 12C:
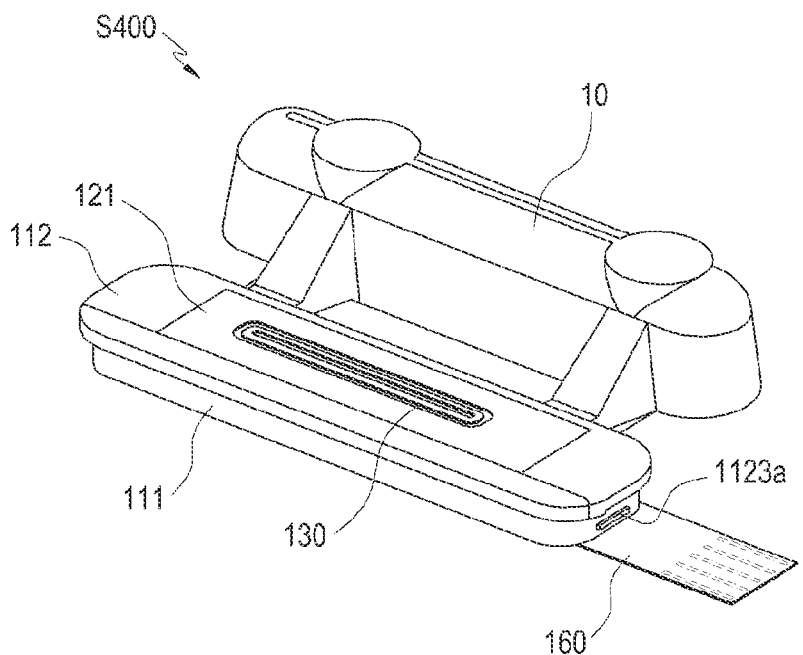

Although the second embodiment of the present invention is described with through-hole 1122 formed in the second key support member 112, the present invention is not limited thereto. For example, the second key support member 112 may have the "cutaway" shape of the third embodiment, as shown in, e.g., FIGS. 12A and 12B. In the configuration of the second key support member 112 according to the third embodiment of the present invention, a part of the second key support member 112 is excluded, or "cut away," from the second key support member 112. Specifically, the portion of second key member 112 forming the outer side of through-hole 1122 is cutaway. In other words, as shown in FIG. 12B, the second key member 112 according to the third embodiment is formed by injection molding without the outer side portion. The outer side portion is later formed by injection molding as part of key support member 111, as shown in FIG. 12C. However, the configuration or the shape of the first and second key support members 111 and 112 may be changed depending on the desired final configuration and/or shape of substrate 120 without limit.

Figure 9A:
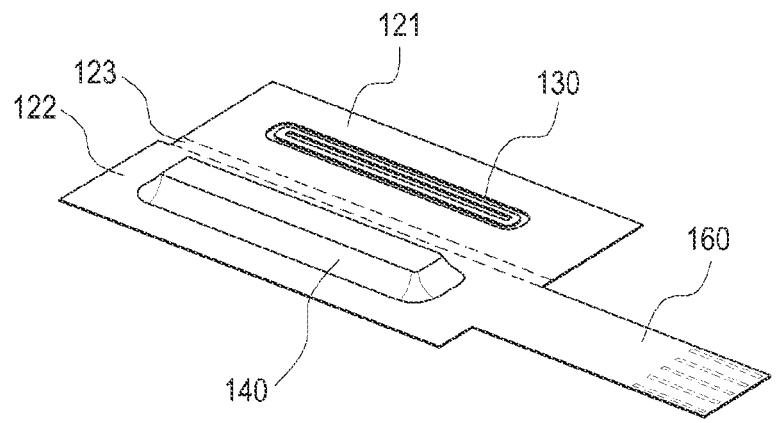
FIG. 9A is a view of the substrate of the input/sensor according to the second and third embodiments of the present invention.
Figure 9B:
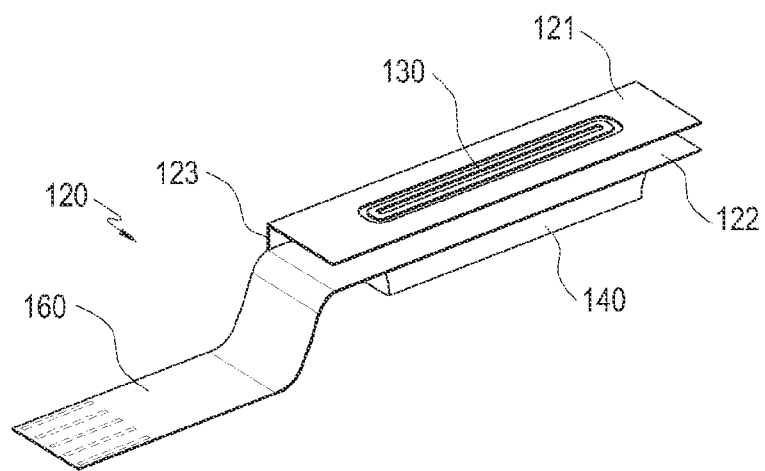
FIG. 9B is a view of the substrate shown in FIG. 9A, in which the substrate is bent.

FIG. 9A is a view of the substrate of the input/sensor according to the second and third embodiments of the present invention, and FIG. 9B is a view of the substrate shown in FIG. 9A when it has been bent around seat 115. In order to clearly demonstrate the final resulting shape of substrate 120 according to the third and second embodiments, FIG. 9B does not show seat 115 or any other portions/members of key support 110.

Figure 10A:
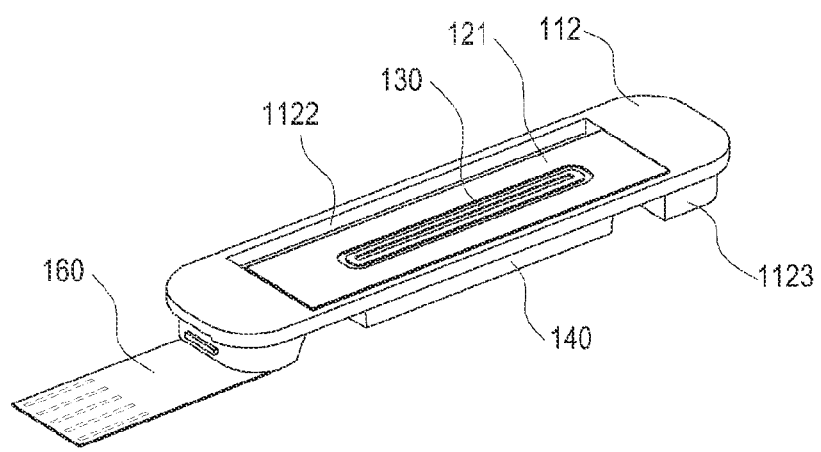
FIG. 10A is a view of an input/sensor according to the second "through-hole" embodiment of the present invention, in which the substrate is seated on the second key support member.
Figure 10B:
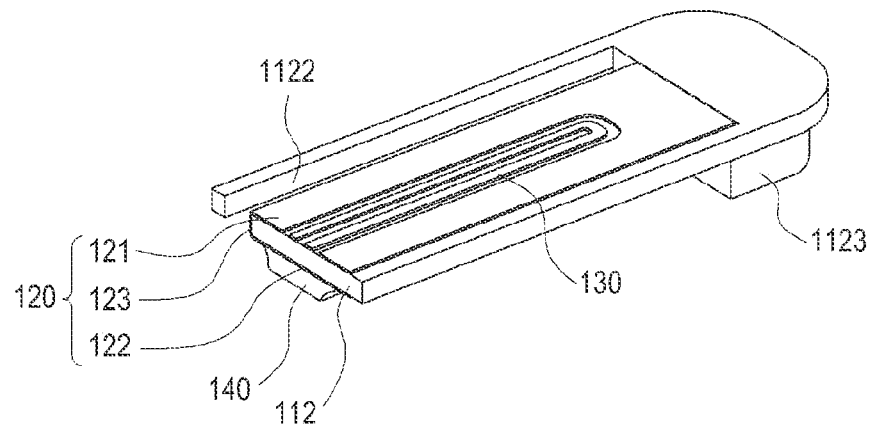
FIG. 10B is a cross-sectional view of the substrate seated in the second key support member shown in FIG. 10A, according to the second "through-hole" embodiment of the present invention.
Figure 10C:
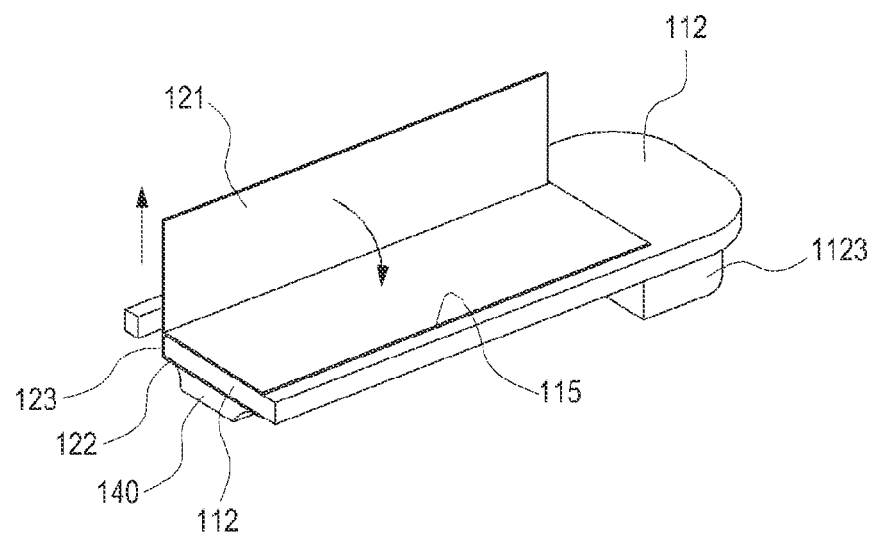
FIG. 10C is a cross-sectional view showing how the substrate is bent around the second key support member, according to the second "through-hole" embodiment of the present invention.

FIG. 10A is a view of the bent substrate 120 of FIG. 9B when seated in the second key support member 112 according to the second embodiment of the present invention, and FIG. 10B is a cross-sectional perspective view of the substrate 120 seated around the second key support member 112 in FIG. 10A. FIG. 10C is a cross-sectional perspective view showing the final stage in the process of wrapping substrate 120 around seat 115 which protrudes from the inside of second key support member 112. Specifically in FIG. 10C, one side of the third ("bent") substrate portion 123 has been bent so that the second (or "bottom") substrate portion 123 having integrated circuit 140 thereon is perpendicular to first (or "top") substrate portion 121 having surface pattern unit 130 thereon. The up arrow in FIG. 10C indicates moving half-bent substrate 120 so that the second (or "bottom") substrate portion 123 having integrated circuit 140 thereon is flush against the bottom of seat 115. The rounded down arrow in FIG. 10C indicates the bending down of the other side of third (or "bent") substrate portion 123 so that the first (or "top") substrate portion 121 having surface pattern unit 130 thereon is flush with the top of seat 115.

Referring to FIGS. 9A through 10B, the substrate 120 may be made of a flexible film member, and includes the first substrate portion 121 (which ends up being the "top" substrate portion) and the second substrate portion 122 (which ends up being the "bottom" substrate portion) which are disposed around the third substrate portion 123 (the sides of which end up being "bent" around seat 115). The substrate 120 is mounted on key support 110, particularly around seat 115 of the second key support member 112. Particularly, the bent substrate portion 123 encloses a side surface of seat 115. During assembly, the first substrate portion 121 is arranged on the upper surface of seat 115 of the second key support member 112, and the second substrate portion 122 is arranged on the lower surface of seat 115 of the second key support member 112. Accordingly, the first substrate portion 121 and the second substrate portion 122 are opposite to each other around seat 115 formed in the second key member 112.

Before the substrate 120 is bent, the signal pattern unit 130 and the integrated circuit 140 are disposed adjacent to each other on a surface of the substrate 120 as shown in FIG. 9A. When the substrate 120 is bent around seat 115, the signal pattern unit 130 disposed on the first substrate portion 121 ends up on the top surface of seat 115, and the integrated circuit unit 140 disposed on the second substrate portion 122 ends up on the bottom surface of seat 115 as shown in FIG. 9B.

As shown in FIG. 10A, the signal pattern unit 130 patterned on the surface of the first substrate portion 121 ends up exposed to the outside. Signal pattern unit 130 according to the second and third embodiments has a configuration different from the signal pattern unit 130 of the first embodiment. The signal pattern unit 130 according to the first embodiment is disposed on the bottom surface of the substrate 120 without an exposure to the outside. However, the signal pattern unit 130 according to the second and third embodiments of the present invention is disposed on the top surface of the first substrate portion 121 and is thus exposed to the outside. Accordingly, the top exposed surface of second key support member 112, the top surface of first substrate portion 121, and the bottom of signal pattern unit 130 are disposed in the same plane so as to form the top surface of the key support 110.

The present invention is not limited to such constructions, however. FIG. 6A illustrates a signal pattern unit 130 which is very thin and disposed on the key support 110. To express this feature, the signal pattern unit 130 in FIG. 6A extends into the coating layer 150. Therefore, although signal pattern unit 130 is typically formed on the same side of the key support 110, signal pattern unit 130 may be formed higher than, lower than, or even with the key support 110.

The signal pattern unit 130 according to the second and third embodiments of the present invention is disposed on the top surface of the key support 110, and is thereby more sensitive in detecting a touch of an object. In the first embodiment as shown in FIGS. 2 through 3B, the signal pattern unit 130 detects a signal of an object which touches input/sensor 100 through both substrate 120 and coating layer 150—i.e., without a direct contact. Thus, the signal pattern unit 130 detects the touch of an object on the surface of input/sensor 100 through a long signal detecting distance. However, in the second and third embodiments of the present invention, the object comes into more direct contact with the signal pattern unit 130, and thus the signal pattern unit 130 has a short signal detecting distance. The signal pattern unit 130 according to the first embodiment has the touch detecting distance as long as a thickness of the substrate 120 and coating layer 150. However, in the second and third embodiments of the present invention, the signal pattern unit 130 has a shorter touch detecting distance, i.e., only as long as one or more layers of coating layer 150. Accordingly, it is possible to increase the thickness of the coating layer 150. When the coating layer 150 has an increased thickness, it is possible to restrict the appearance of coupling lines or surface defects to the outside, thereby improving the aesthetic appeal of the electronic device. When the coating layer 150 has a thickness identical to that of the first embodiment, the signal pattern unit 130 has an improved detecting capability.

Returning to FIGS. 9A-9B, a flexible connecting substrate portion 160 is connected at the second substrate portion 122 neighboring the third "bent" substrate portion 123, extends therefrom, and will be electrically connected to a circuit board provided in the electronic device. When the substrate 120 is mounted on the second key support member 112, the connecting substrate 160 is bent, as shown in FIG. 9B, and exposed to the outside of the key support 110, as shown in FIG. 10A. When the key support 110 is mounted in the electronic device 1, therefore, it is easier for the connecting substrate 160 to come in electrical contact with the circuit board of the electronic device.

As described above, when the substrate 120 is arranged to enclose a periphery of seat 115 protruding as part of the second key support member 112, the exposed top surfaces on second key support member 112, the top surface of first substrate portion 121 and the bottom of signal pattern unit 130 are arranged in the same plane.

Then, the coating layer 150 is coated on the exposed top surfaces of key support 110 and substrate 120 mounted thereon. As described above with respect to the first embodiment, the coating layer 150 prevents surface defects cause by substrate 120, key support 110, the line where the substrate 120 and the key support 110 connect, and the mark caused by the under-fill (UF) of the integrated circuit unit 140 disposed on the surface of the second substrate portion 122 of substrate 120, from being exposed to the outside. The coating layer 150 may have plural layers, including a primer, a color layer, a coating layer, and the like. Further, the coating layer 150 may be formed on the exposed surfaces as a painting, an in-mold, a printing, a coating and the like.

FIG. 11 is a perspective view illustrating the attachment of a decoration unit to a surface-coated and assembled key support 110 and substrate 120 according to embodiments of the present invention. When the conjoined key support 110, substrate 120, and decoration unit 170 is mounted in the electronic device, it improves its aesthetic appeal, enhances the rigidity of the key support 110, and facilitates the combination of input/sensor 100 with the electronic device 1. The previous description in regards to the first embodiment of the shape or assembling of the decoration unit 170 may also apply to the second and third embodiments.

In the input/sensor 100 according to embodiments of the present invention, a fingerprint recognition unit has signal pattern unit 130 disposed in the key support 110 of an input key, thereby improving the security of the electronic device by providing fingerprint recognition through the input/sensor 100.

Figure 13:
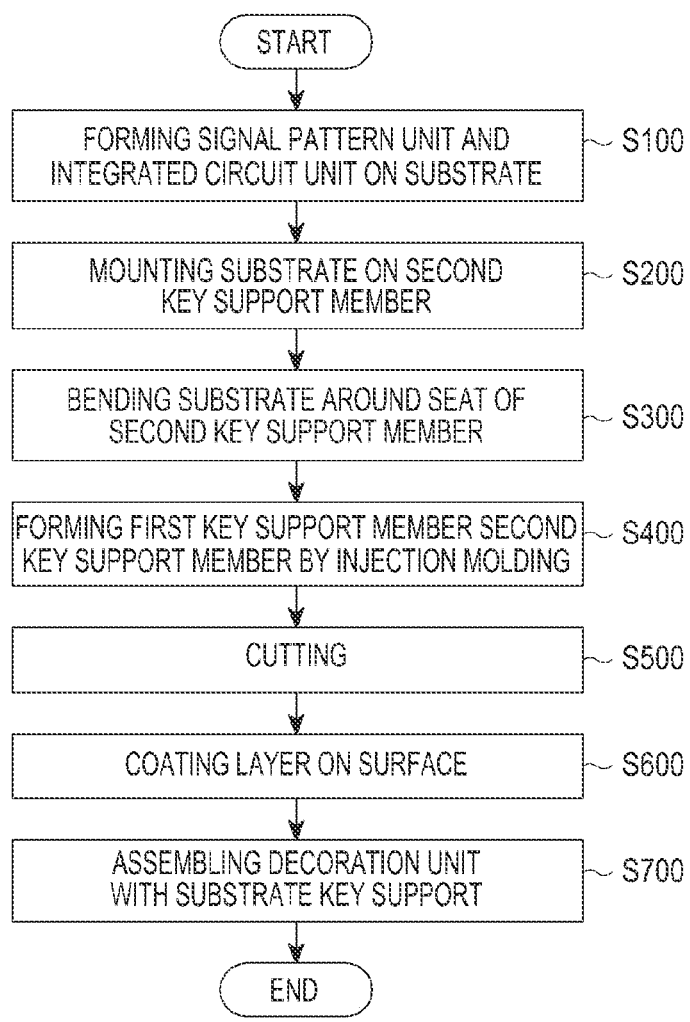
FIG. 13 is a flow chart illustrating a method of manufacturing process according to the third "cutaway" embodiment of the present invention.
Figure 14:
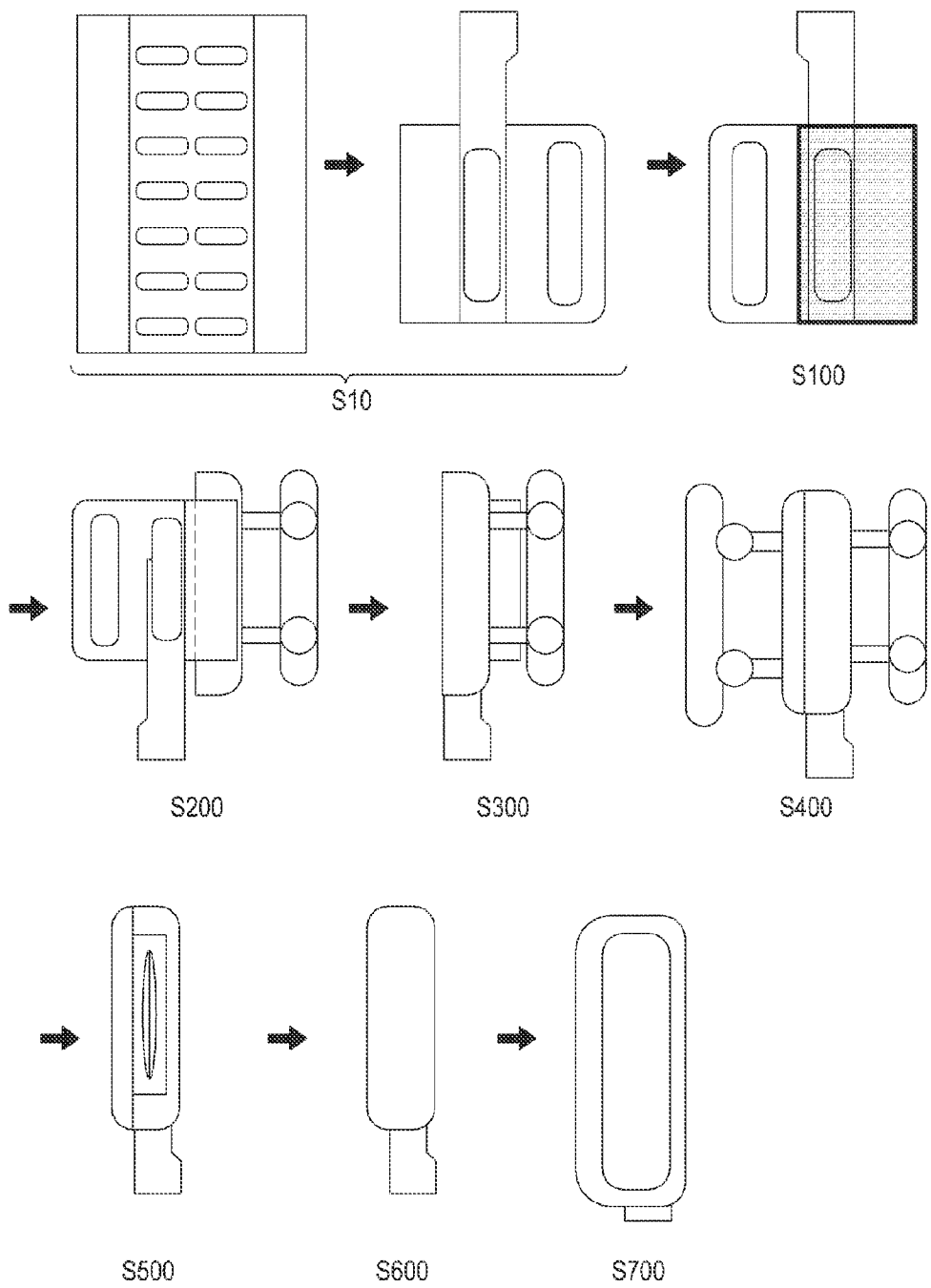
FIG. 14 has views sequentially illustrating the process of manufacturing the input/sensor shown in FIGS. 12A to 12F.

Hereinafter, a process of manufacturing the input/sensor according to the third embodiment of the present invention will be described. FIGS. 12A through 12F are views illustrating the sequence for assembling an input/sensor according to the third embodiment of the present invention, and FIG. 13 is a flowchart of a method for manufacturing the input/sensor shown in FIGS. 12A to 12F. FIG. 14 is a series of views sequentially illustrating an actual process for manufacturing the input/sensor as shown in FIGS. 12A to 12F.

Referring to step(s) S10 of FIG. 14, a plurality of substrates 120 on a flexible film member are manufactured, and the resulting film member is cut and separated into individual substrates. In step S100 shown in FIGS. 13 and 14, the signal pattern unit 130 is patterned on a surface of each substrate and is electrically connected to the integrated circuit unit 140 also disposed on the surface of each substrate. In step S200 of FIGS. 12A, 13, and 14, the substrate 120, on which the signal pattern unit 130 and the integrated circuit unit 140 are disposed, is mounted on the second key support member. The second key support member may be formed by injection molding as shown in FIG. 12A. In FIG. 12A, injection moldings 10 attached to the side of the second key support member 112 are produced in the injection molding process and cut away later on. Similarly, film member 20 formed at an end of the substrate 120 is later bent and then cut away along with the injection moldings 10.

After the first substrate portion 121 of flat substrate 120 is placed on seat 115 formed in the second key support member 112 as shown in step S200 of FIG. 12A and FIG. 14, the flat substrate 120 is bent to enclose seat 115 in the second key support member 112 in step S300 of FIGS. 12B, 13, and 14. Accordingly, the first substrate portion 121 is mounted on the top surface of seat 115 in the second key support member 112, and the second substrate portion 122 is mounted on the bottom surface of seat 115 of the second key support member 112.

After the substrate 120 is mounted on the second key support member 112 (enclosing seat 115 thereof), the first key support member 111 is formed on the second key support member 112 by a double injection molding in step S400 as shown in FIGS. 12C, 13, and 14 (the injection moldings for the first key support member 111 are only shown in step S400 of FIG. 14). At this point, the signal pattern unit 130 patterned on the substrate 120 is exposed on the top surface, and the connecting substrate 160 extends outwardly from a bottom side of the key support 110 and is exposed to the outside, as shown in FIG. 12C.

After step S400, the key support 110 has injection moldings formed on both sides (as shown in S400 on FIG. 14), and film member 20 of substrate bent under (in step S300), and thus disposed at one side of, the key support 110. Then, in step S500 of FIGS. 13 and 14, the injection moldings and the film member 20 are cut away to achieve the assembled key support 110 and substrate 120 to be provided as an input/sensor to the electronic device 1 (step S500 only shown in FIG. 14).

Figure 12D:
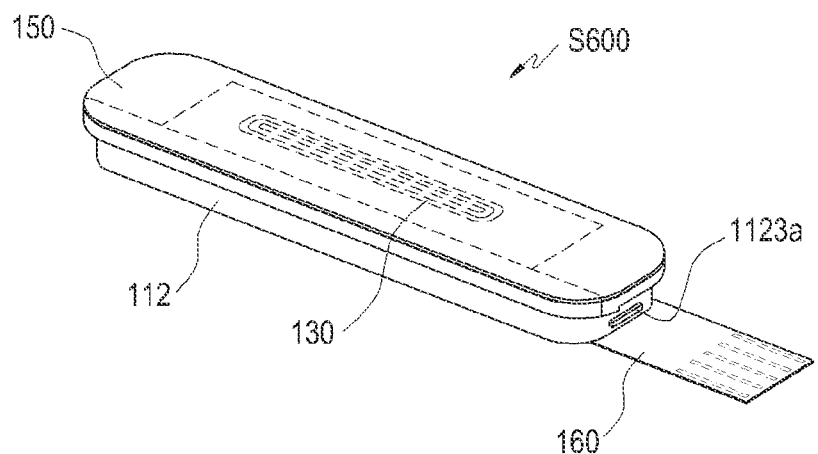
Figure 12E:
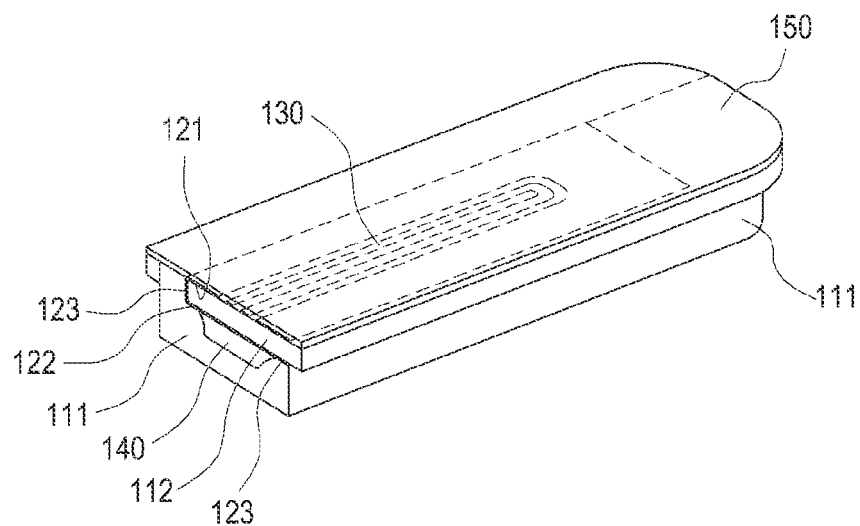

Since the top surfaces of the second key support member 112, the first substrate portion 121, and the signal pattern unit 130, as well as any coupling lines formed therebetween, are exposed as shown in step 500 of FIG. 14, the coating layer 150 is coated on the top surfaces to cover them in step S600, as shown in FIGS. 12D, 12E, and 14. FIG. 12E is a cross-sectional view of the surface-coated key support 110/substrate 120 shown in FIG. 12D.

Figure 12F:
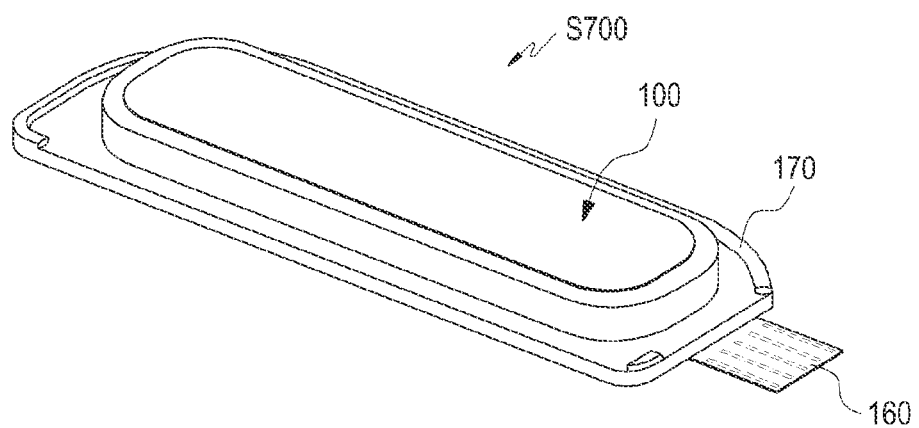

In step S700, as shown in FIGS. 12F, 13, and 14, the key support 110/substrate 120 coated with the coating layer 150 is assembled with the decoration unit 170, thereby allowing the electronic device to have a beautiful appearance.

The input/sensor 100 according to embodiments of the present invention can detect the touch of the object because the substrate 120 having the signal pattern unit 130 and the integrated circuit unit 140 is mounted on the key support 110. If the signal pattern unit 130 is configured to recognize a fingerprint, an input key, such as a home button, implemented as input/sensor 100 also operates as a security device capable of recognizing the user's fingerprint.

Specifically, when the input/sensor 100 is implemented in/as the home button of the electronic device, when a user touches the home button with his/her finger, the input/sensor 100 can detect a user's fingerprint through the fingerprint recognition unit 108, for example, either by controller 104 connected directly to signal pattern unit 130 or by the integrated circuit unit 140 connected to the signal pattern unit 130.

Operations such as unlocking or setting the electronic device may be performed through the fingerprint detected by fingerprint recognition unit 108. This can enhance the security of the electronic device more than a locking method which uses a pattern lock or a password.

Further, in the input/sensor 100 according to the second and third embodiments, the substrate 120 is bent around a portion of key support 110, thereby securing a stable assembling of the substrate 120 and providing a structure, which is rigid against external impact, to the substrate 120. Furthermore, the signal pattern unit 130 according to the second and third embodiments is mounted closer to the top surface of input/sensor 100, thereby improving the touch detecting capability of the input/sensor 100.

The electronic device according to the embodiments of the present invention can detect the touch of an object on the exposed surface of any input key, such as a home button, through a signal pattern unit disposed on a substrate mounted in a key support.

Moreover, the input/sensor according to some embodiments of the present invention has a simple structure in that the signal pattern unit and the integrated circuit unit are disposed on the substrate, and thus can easily detect the touch of the object through the signal pattern unit and the integrated circuit unit.

In addition, the input/sensor according to the second and third embodiments of the present invention has a structure in that the flexible substrate is bent around and encloses the periphery of a protrusion from the key support, such that the signal pattern unit is arranged toward the outside surface of input/sensor 100. Accordingly, since the touch detecting distance between the outside surface of input/sensor 100 and the signal pattern unit is shorter, it improves the capability of the signal pattern unit to detect an object. On the other hand, according to the second and third embodiments of the present invention, it is possible to cover the signal pattern unit or the periphery of the substrate which are exposed to the outside with a thicker coat layer so as to achieve a high-quality appearance and design.

Further, the components which comprise the input/sensor and detect signals can be stably assembled, and thus it is possible to establish the stable input/sensor against external impact.

While the present invention has been shown and described with reference to certain embodiments thereof, it will be understood by those skilled in the art that various modifications in form and details may be made therein without departing from the spirit and scope of the present invention as defined by the appended claims.

What is claimed is:

1. An input sensor for an electronic device comprising:
   a key support comprising a first key support member and a second key support member provided on the first key support member; and
   a substrate comprising a first substrate portion, a second substrate portion, and a bending portion connecting the first substrate portion and the second substrate portion, the first substrate portion disposed on an upper surface of the second key support member and having a signal pattern unit patterned on a first surface of the first substrate portion, the signal pattern unit configured to generate a transmission signal or a reception signal according to a touch or proximity of an object, and the second substrate portion disposed on a lower surface of the second key support member and having an integrated circuit unit disposed on a second surface of the second substrate portion and positioned within the first key support member and electrically connected to the signal pattern unit; and
   a controller configured to process a signal received from the signal pattern unit or the integrated circuit unit.

2. The input sensor of claim 1, wherein the second key support member comprising a seating portion configured to be positioned adjacent to the integrated circuit unit.

3. The input sensor of claim 1, wherein the substrate further comprises:
   an extension configured to electrically connect the substrate to the controller of the electronic device.

4. The input sensor of claim 3, wherein the extension is further configured to transmit data from the integrated circuit unit to the controller.

5. The input sensor of claim 1, further comprising:
   a coating layer configured to cover at least a part of the signal pattern unit.

6. The input sensor of claim 1, further comprising:
   a decoration unit engaged with the key support and enclosing at least a part of the key support.

7. The input sensor of claim 1, wherein the signal pattern unit recognizes a fingerprint and transmits a corresponding signal to the integrated circuit unit, which processes the corresponding signal.

8. The input sensor of claim 7, wherein the controller receives the processed signal and performs a predetermined operation.

9. The input sensor of claim 1, further comprising:
   a coating layer coated on outside-facing surfaces of the first and second key support members and the substrate so as to cover the signal pattern unit.

10. The input sensor of claim 1, wherein a first outward facing surface of the seating portion is recessed from the remaining outward-facing surface of the second key support member at a depth substantially equivalent to a width of the first substrate portion.

11. An electronic device, comprising:
a mechanical key input comprising a sensor input, the sensor input comprising:
a key support comprising a first key support member having a seating portion and a second key support member provided on the first key support member; and
a substrate comprising a first substrate portion, a second substrate portion, and a bending portion connecting the first substrate portion and the second substrate portion, the first substrate portion disposed on an upper surface of the second key support member and a first surface of the first substrate portion patterned with a signal pattern unit, the signal pattern unit configured to generate a signal according to a touch or proximity of an object, and the second substrate portion having a second surface with an integrated circuit unit disposed within the first key support member, the integrated circuit unit being electrically connected to the signal pattern unit.

12. The electronic device of claim 11, wherein the seating portion comprises a protrusion from an inside surface of the second key support member.

13. The electronic device of claim 12, wherein the input sensor further comprises:
a coating layer configured to cover at least an outward-facing portion of the signal pattern unit.

14. The electronic device of claim 12, further comprising: a controller electrically connected to the substrate.

15. The electronic device of claim 14, wherein the substrate further comprises:
an extension configured to electrically connect with the controller.

16. The electronic device of claim 12, further comprising: a decoration unit engaged with the key support.

17. A method of manufacturing an input sensor, comprising:
providing a key support comprising a first key support member and a second key support member provided on the first key support member;
providing a substrate configured to be disposed around the second key support member, the substrate comprising a first substrate portion, a second substrate portion, and a bending portion connecting the first substrate portion and the second substrate portion, and the first substrate portion having a signal pattern on an upper surface of the first substrate portion and the second substrate portion having an integrated circuit unit disposed on a lower surface of the second substrate portion and positioned within the first key support member; and
mounting the substrate around the second key support member such that the first substrate portion is disposed on the top surface of the second key support member and the second substrate portion is disposed on the bottom surface of the second key support member.

18. The method of claim 17, wherein a signal pattern unit is patterned on a surface of the first substrate portion.

19. The method of claim 18, wherein an integrated circuit is disposed on a surface of the second substrate portion, and the integrated circuit is electrically connected to the surface pattern unit.

20. The method of claim 18, further comprising:
coating at least an outward-facing portion of the signal pattern unit with one or more coating layers.

21. The method of claim 17, wherein the key support comprises a first key support member and a second key support member comprising the seating portion.

22. The method of claim 21, wherein providing the key support comprises:
providing, before the mounting step, the second key support member; and
providing, after the mounting step, the first key support member.

23. The method of claim 22, wherein at least one of providing the second key support member or providing the first key support member is performed using injection molding.

24. The method of claim 22, wherein the substrate as provided is flat, the first substrate portion has a surface pattern unit patterned therein, the second substrate portion has an integrated circuit unit disposed thereon, and a third substrate portion is disposed between the first and second substrate portions, and
wherein the surface pattern unit is patterned into, and the integrated circuit unit is disposed on, the same side of the provided flat substrate.

25. The method of claim 24, wherein the provided second key support member has a through-hole adjacent to the seating portion, and mounting comprises:
bending the provided flat substrate at a line between the third and second substrate portions so that the first and third substrate portions are substantially perpendicular to the second substrate portion;
inserting the first and third substrate portions through the through-hole until the second substrate portion is disposed on the bottom surface of the seating portion; and
bending the substrate at a line between the first and third substrate portions such that the first substrate portion is disposed on the top surface of the seating portion.

* * * * *